Patented July 20, 1948

2,445,518

UNITED STATES PATENT OFFICE 2,445,518

ALKYLENE DIHYDRAZINES AND PROCESS FOR PRODUCTION

Henry Dreyfus, deceased, late of London, England, by Claude Bonard, administrator, London, England, assignor to Celanese Corporation of America, a corporation of Delaware No Drawing. Application May 13, 1946, Serial No. 669,451. In Great Britain February 10, 1943

11 Claims. (Cl. 260—583)

This invention relates to certain novel organic compounds containing hydrazino groups, and to the manufacture of such compounds, and is a continuation-in-part of application S. No. 517,581, filed January 8, 1945, which has become abandoned.

The novel compounds with which the invention is concerned will be referred to collectively as "aliphatic dihydrazines." They are characterised by containing two hydrazino groups or substituted hydrazino groups, each of which is attached to a saturated carbon atom otherwise bound only to carbon and hydrogen, in particular a methylene or alkyl-substituted methylene group; the methylene or substituted methylene groups are preferably linked by a carbon atom or a chain of carbon atoms, but they may be linked by an atom other than carbon or by a chain which includes one or more atoms other than carbon, e. g. an oxygen atom; moreover the chain may comprise a cyclic structure. Among these aliphatic dihydrazines the polymethylene dihydrazines, especially unsubstituted polymethylene dihydrazines (alpha: omegadihydrazino normal paraffin hydrocarbons) containing 4–6 carbon atoms, have been found to be particularly useful.

One method of making aliphatic dihydrazines in accordance with the invention comprises heating an aliphatic dihalide with hydrazine. The polymethylene dihydrazines, especially tetramethylene, pentamethylene and hexamethylene dihydrazines, are made by heating the corresponding alkylene dichlorides or other dihalides with hydrazine.

It is preferable to heat a solution of the aliphatic dihalide and the hydrazine in a common solvent, for example an aqueous lower aliphatic alcohol such as aqueous methanol, ethanol or isopropanol. Thus a solution of hydrazine in an aqueous alcohol, made for example by adding aqueous hydrazine hydrate to the alcohol, may be mixed with the aliphatic dihalide, and the mixture boiled for a few hours under reflux. On the other hand the two reactants may be mixed at the reaction temperature; for example a solution of the aliphatic dihalide in methanol or ethanol may be boiled under reflux while a hydrazine solution, made by dissolving aqueous hydrazine hydrate in the same alcohol, is gradually added thereto; alternatively a solution of hydrazine in aqueous methanol or ethanol may be boiled under reflux and the dihalide, which may also be dissolved in the alcohol, added to the boiling hydrazine solution. Preferably the heating is continued for some time after all the hydrazine (or the dihalide) has been added.

Although theoretically two molecular proportions of hydrazine are required to react with each molecular proportion of the dihalide, it is very advantageous to employ a considerably higher proportion of hydrazine. For example, the amount of hydrazine added to the dihalide may be from 3 to 12 times the amount theoretically required, i. e. from 6 to 24 molecular proportions for each molecular proportion of the dihalide.

While it has been found very convenient to heat the reactants to the boiling point of the solvent at atmospheric pressure, i. e. to about 65°–70° or 78°–80° C. when the reactants are dissolved in aqueous methanol or ethanol respectively, the reaction may be carried out at temperatures either above or below these values. It is preferable however to heat the reactants to at least 50° C. in order to cause the reaction to proceed at a suitable speed, while generally speaking it is best not to raise the temperature much above 100° C.

In the course of the reaction the hydrogen halide liberated appears to combine preferentially with the aliphatic dihydrazine to form its dihydrohalide, any remaining free hydrogen halide then combining with part of the excess hydrazine. When, as is preferred, an aliphatic dichloride is employed as starting material the dihydrochloride of the resulting aliphatic dihydrazine is formed. It has been found that while the dihydrohalides, especially the dihydrochlorides, of the aliphatic dihydrazines can easily be separated from hydrazine dihydrochloride by fractional crystallization, it is much more difficult to separate them from hydrazine monohydrochloride, and that to isolate the aliphatic dihydrazine dihydrochlorides it is therefore preferable to ensure that all the hydrazine present is also in the form of the dihydrochloride. To this end as much as possible of the unreacted hydrazine is preferably removed from the products of the reaction by distillation under reduced pressure, for example under a pressure of 20 to 60 mm. and after this at least sufficient, and preferably a good deal more than sufficient, aqueous hydrochloric acid is added to the residue to convert all the hydrazine contained therein into its dihydrochloride. The mixture of the dihydrochlorides of the aliphatic dihydrazine and the hydrazine may be separated for example by fractional crystallization from methanol or ethanol. The free aliphatic dihydrazine can if desired be obtained by treating the dihydrochloride with an alkali, e. g. with sodium hydroxide.

The aliphatic dihydrazines may be isolated by other methods. For example they may be obtained in the form of salts other than the dihydrochloride. For instance the solution of the aliphatic dihydrazines dihydrochloride, with some hydrazine hydrochloride, remaining after distilling off part of the hydrazine as described above, may be treated with an alkali in amount sufficient to combine with all the chlorine in the solution to form the free aliphatic dihydrazine and free hydrazine; by diluting the solution with ether and cooling it strongly the alkali metal chloride formed may be precipitated, after which sufficient sulfuric acid may be added to combine with both the aliphatic dihydrazine and the hydrazine. The hydrazine sulphate formed is at once precipitated and may be filtered off; the filtrate is then evaporated and the aliphatic dihydrazine sulphate purified by recrystallisation from ethanol. It is however less easy to obtain the sulphates of aliphatic dihydrazines in a pure condition than the hydrochlorides, and it is therefore generally preferable to isolate the dihydrazines in the form of their dihydrochlorides rather than as sulphates.

Another method of isolating the aliphatic dihydrazines is to form their benzaldehyde derivatives and at the same time the benzaldehyde derivatives of the unreacted hydrazine, since these derivatives are easily separated. For example a mixture of polymethylene dihydrazine dihydrochloride and hydrazine dihydrochloride obtained after distilling off as much hydrazine as is practicable and adding the necessary hydrochloric acid, may be treated in the cold with water and benzaldehyde, whereupon the hydrazine benzaldehyde derivative (benzalazine) is precipitated, leaving the polymethylene dihydrazine benzaldehyde derivatives in solution. The precipitate is at once filtered off and, preferably after adding a further small quantity of benzaldehyde, the filtrate is allowed to stand for an hour or more, whereupon the polymethylene dihydrazine benzaldehyde derivative separates out. It may be purified by recrystallisation, e. g. from ethanol, and may then if desired be converted into the polymethylene dihydrazine dihydrochloride by adding the equivalent amount or excess of aqueous hydrochloric acid and removing the liberated benzaldehyde by steam distillation.

As already stated, the free aliphatic dihydrazines can be obtained by first isolating their dihydrochlorides and then treating them with a suitable alkali. If desired however the free dihydrazines may be obtained from the products of the reaction without isolating the dihydrochlorides. For example, after most of the hydrazine has been removed from the products of the reaction by distillation under low pressure, the residue may be dissolved in alcohol containing a little water and sufficient of a strong base, e. g. sodium or potassium hydroxide, or sodium or potassium methoxide or ethoxide in the corresponding alcohol, added to combine with all the chlorine in the solution. The free aliphatic dihydrazine so formed may be isolated by fractional distillation under low pressure.

By employing a substituted hydrazine, e. g. methyl hydrazine, ethyl hydrazine, or phenyl hydrazine, in place of hydrazine itself, nitrogen-substituted aliphatic dihydrazines can be obtained. For example unsubstituted alkylene dichlorides react with methyl hydrazine to give polymethylene dimethyl-di-hydrazines of formula $H_2N.N(CH_3).(CH_2)_nN(CH_3).NH_2$, and ethyl hydrazine gives the corresponding ethyl derivative; phenyl hydrazine on the other hand gives polymethylene diphenyl-di-hydrazines of formula $C_6H_5.NH.NH.(CH_2)_nNH.NH.C_6H_5$. Substituted hydrazines react with aliphatic dihalides under substantially the same conditions as hydrazine itself and the nitrogen-substituted aliphatic dihydrazines may be isolated by the methods described above.

Not only aliphatic dihalides but also aliphatic di-ureas or diamines can be employed as starting materials for the manufacture of aliphatic dihydrazine according to the invention. Thus aliphatic dihydrazines can be made from aliphatic diamines by first converting the diamines into diureas, then forming the dinitroso compounds of the diureas and reducing them to disemicarbazides by means of zinc and an aliphatic acid, and finally hydrolysing the disemicarbazides to the dihydrazines.

The aliphatic diamines, e. g. tetramethylene, pentamethylene and hexamethylene diamines, can be converted into the corresponding diureas by reaction with a metal cyanate, e. g. sodium cyanate, and an acid. Advantageously the acid, preferably fairly dilute hydrochloric acid, is added to the diamine in amount sufficient to give rise to a slightly acid solution, and the metal cyanate, dissolved or suspended in water, is then added. Evaporation of the resulting solution gives a mixture of the desired diurea with an inorganic salt. Thus, when sodium cyanate and hydrochloric acid are employed a mixture of the diurea and sodium chloride is obtained, from which the sodium chloride can be removed by washing with water.

In another method of making aliphatic diureas, an aliphatic diamine is heated with urea. Preferably a mixture of the diamine with urea is heated to 130–150° C.; the best yields are obtained when a moderate excess of urea, e. g. three molecular proportions of urea to each molecular proportion of the diamine, is employed. If desired the diamine and urea may be heated in the presence of a common solvent or of some other liquid diluent, but this is in general less advantageous.

The aliphatic diureas may be converted into their di-nitroso derivatives by the action of a nitrite, especially sodium or potassium nitrite, in the presence of an acid, or by treatment with nitrous fumes, in either case the reaction should be performed at a low temperature. A mineral acid, e. g. sulphuric acid, may be used in conjunction with a metal nitrite, but it is preferable to use a lower fatty acid, especially glacial acetic acid. The nitrite is preferably added slowly and in moderate excess to a cooled solution or suspension of the diurea in the acid. If the diurea is in solution in glacial acetic acid the temperature should initially be only just high enough to keep the solution from solidifying, and as the reaction proceeds the temperature may with advantage be lowered, for example down to −5° or −10° C. After all the nitrite has been added the product is run off into ice water and the precipitated dinitrosodiurea is filtered off and washed with water.

As the aliphatic dinitroso-diureas are somewhat unstable it is advisable to reduce them to the semicarbazides as soon as practicable after their formation. The reduction is preferably carried out by dissolving the dinitroso-diurea in an aqueous lower fatty acid, especially acetic acid, and adding zinc dust slowly to the solution, keeping the temperature low, preferably in the neighbourhood of 0°–20° C. When the reduction has been completed the product may be freed from unreacted zinc dust by filtration, and then heated with hydrochloric acid or another mineral acid to hydrolyse the semi-carbazide and to form the dihydrochloride or other salt of the resulting aliphatic dihydrazine. The dihydrazine may be isolated in the form of its dihydrochloride or as a salt of another acid, as a benzaldehyde derivative, or as the free base, as described above.

Aliphatic dihydrazines, and especially polymethylene dihydrazines, are of considerable value as intermediates in the formation of more complex organic compounds. In particular they are of importance for making certain classes of high polymers as described in U. S. application S. No. 510,786, filed November 18, 1943.

The following examples illustrate the invention:

Example 1

1000 parts by weight of 50% hydrazine hydrate was dissolved in 500 parts of methanol or ethanol, and the solution vigorously boiled under a reflux condenser. 77.5 parts of 1:6-dichlorohexane was added continuously over a period of an hour and the mixture was boiled for a further hour. The resulting solution was distilled at 120° C. under 50 mm. pressure in a stream of hydrogen. The distillate contained 250 parts of unchanged hydrazine. The residue, containing the hexamethylene dihydrazine formed in the reaction, was dissolved in water and acidified with 375 parts of concentrated hydrochloric acid. Hydrazine dihydrochloride was precipitated and filtered off, and the filtrate was concentrated by evaporation by reduced pressure to a syrupy consistency, and the syrup allowed to solidify. The solid product was recrystallized twice from methanol, and gave hexamethylene dihydrazine dihydrochloride of about 98.5% purity, (M. P. 142–143° C.).

Example 2

A solution of 1330 parts by weight of 50% hydrazine hydrate in 1600 parts of methanol was added to 100 parts of 1:6-dichlorohexane and the mixture boiled under reflux for 6 hours. The product was distilled under ordinary pressure up to a temperature of 90° C. to remove the methanol and a certain amount of the unchanged hydrazine and 320 parts of water was then removed by azeotropic distillation with toluene. 72 parts of potassium hydroxide was then added together with fresh toluene, after which the distillation was continued at a temperature of 85° C. until no more distillate came over. The temperature was then raised to about 120° C. to remove further hydrazine and water. At this point potassium chloride began to be precipitated from the solution; methanol was added to the solution to ensure that substantially all the salt was precipitated and the salt was filtered off. The filtrate was distilled under atmospheric pressure up to a liquid temperature of 120° C. to remove the methanol and any remaining hydrazine, and was then fractionally distilled under a pressure of 10 mm. to isolate the free hexamethylene dihydrazine. This is a water-white alkaline hygroscopic liquid with a rather pleasant odour, soluble in water and methanol but insoluble in ether. It boils at 178°–180 C. 10–12 mm.

Example 3

155 parts by weight of 1:6-dichlorohexane dissolved in 160 parts of methanol was fed during 2 hours into a boiling mixture of 620 parts of 50% hydrazine hydrate and 320 parts of methanol. The mixture was boiled under reflux for a further hour, and was then distilled under 50 mm. pressure up to a liquid temperature of about 125° C.

400 parts of concentrated hydrochloric acid was added to the residue, and the hydrazine dihydrochloride precipitated was filtered off; the filtrate was then concentrated under reduced pressure to precipitate any remaining hydrazine dihydrochloride as completely as possible, leaving a solution of syrupy consistency comprising crude hexamethylene dihydrazine dihydrochloride. The crude product was recrystallized from a mixture of 4 volumes of methanol and one volume of butanol.

Example 4

155 parts by weight of 1:6-dichlorohexane was added slowly to a boiling mixture of 1520 parts of water, 750 parts of ethanol and 640 parts of hydrazine, and boiling was continued for some time after all the 1:6-dichlorohexane had been added. The resulting solution was distilled under 50 mm. pressure until about 500 parts of hydrazine had come over. 1000 parts of water and 1350 parts of 15% hydrochloric acid were added to the residue and the mixture evaporated almost to dryness, whereupon a colourless crystalline solid separated. This was essentially a mixture of the dihydrochlorides of hexamethylene dihydrazine and of hydrazine.

200 parts by weight of this mixture was vigorously stirred with 1200 parts of water and 250 parts of benzaldehyde. The precipitate was filtered off and washed with dilute hydrochloric acid, the washings being added to the filtrate. A further 50 parts of benzaldehyde were then added to the filtrate and the resulting mixture stirred and the precipitate removed by filtration. Both these precipitates consisted essentially of benzalazine formed from the unchanged hydrazine.

On adding a further 50 parts of benzaldehyde and allowing the solution to stand, a pale yellow solid separated and was filtered off. This was the benzaldehyde derivative of hexamethylene dihydrazine; after being recrystallized from alcohol it melted at 158° C. This compound was then steam distilled from dilute hydrochloric acid to decompose it and remove the benzaldehyde, and the residue was evaporated under reduced pressure and recrystallized from a mixture of ethanol and ether. The crude hexamethylene dihydrazine dihydrochloride so obtained was recrystallized from 95% ethanol.

Example 5

230 parts by weight of hexamethylene diamine and 360 parts of urea were heated together to 130–140° C. for 3 hours. Ammonia was given off and the mixture set to a white solid which was then dissolved in boiling water. On cooling the aqueous solution hexamethylene diurea (M. P. 198° C.) crystallized.

200 parts of the hexamethylene diurea was finely ground and dissolved in 525 parts of glacial acetic acid. The solution was cooled almost to the solidifying point of the acetic acid, and a solution of 200 parts of sodium nitrite in 500 parts of water was added gradually over a period of 2 hours. During this period the mixture was further cooled until the temperature had fallen to −10° C., and this was maintained for a further 2 hours after all the mixture had been added, stirring being continuous throughout. The product was then poured into an excess of ice water, whereupon hexamethylene dinitrosodiurea was precipitated; the precipitate was filtered off and washed thoroughly with water.

The dinitroso-diurea was then stirred vigorously with 1200 parts of water and 525 parts of glacial acetic acid at a temperature of about 0° C. 800 parts of zinc dust was added during 1½ hours, after which stirring was continued for a further hour at about 15° C. The mixture was then filtered free from zinc dust and the filtrate was evaporated under reduced pressure to a syrupy consistency. 1200 parts of concentrated hydrochloric acid was then added, and the mixture boiled under reflux for 16 hours, and again evaporated under reduced pressure to a syrupy consistency. Alcohol (800 parts), benzaldehyde (150 parts) and sodium (150 parts) were added, and the mixture was warmed gently for about 30 minutes, and then diluted with water and extracted twice with ethylene dichloride. The extract was evaporated, and the residue was warmed gently with fairly dilute hydrochloric acid, after which it was subjected to steam distillation until no more benzaldehyde came over. The residue was then evaporated to dryness under reduced pressure. It consisted mainly of hexamethylene dihydrazine dihydrochloride, which was purified by recrystallization from a hot ethanol-chloroform mixture.

In any of the Examples 1-4 the 1:6-dichlorohexane may be replaced by the equivalent quantity of 1:4-dichlorohexane, the product of the reaction then being tetramethylene dihydrazine. Similarly in Example 5 tetramethylene diamine may be employed in place of hexamethylene diamine. Tetramethylene dihydrazine is a water-white alkaline liquid closely resembling hexamethylene dihydrazine.

Examples of aliphatic dihydrazines other than the unsubstituted polymethylene dihydrazines are alkyl-substituted, especially methyl substituted, polymethylene dihydrazines, and compounds containing in the chain an oxygen atom, e. g. 2:2'-dihydrazino-diethyl ether, which may be made from 2:2'-dichloro-diethyl ether by the method described above.

Having described the invention, what is desired to secure by Letters Patent is:

1. As new compounds, polymethylene dihydrazines of the formula $H_2N.NH.(CH_2)_n.NH.NH_2$, when $n$ is an integer greater than 2.

2. As a new compound hexamethylene dihydrazine.

3. As a new compound tetramethylene dihydrazine.

4. Process for the manufacture of a polymethylene dihydrazine which comprises heating to a temperature of 50 to 100° C. 1 molecular proportion of an unsubstituted alkylene dihalide with more than 6 molecular proportions of hydrazine, the hydrazine being the only basic substance present.

5. Process for the manufacture of a polymethylene dihydrazine, which comprises heating to a temperature of 50 to 100° C. one molecular proportion of an unsubstituted alkylene dichloride with more than six molecular proportions of hydrazine, the hydrazine being the only basic substance present.

6. Process for the manufacture of hexamethylene dihydrazine, which comprises heating to a temperature of 50 to 100° C. one molecular proportion of hexamethylene dichloride with more than six molecular proportions of hydrazine, the hydrazine being the only basic substance present.

7. Process for the manufacture of a polymethylene dihydrazine, which comprises heating to a temperature of 50 to 100° C. one molecular proportion of an alkylene dichloride with more than six molecular proportions of hydrazine in solution in an aqueous lower aliphatic alcohol, the hydrazine being the only basic substance present.

8. Process for the manufacture of a polymethylene dihydrazine, which comprises heating to a temperature of 50 to 100° C. one molecular proportion of an unsubstituted alkylene dichloride with 6–24 molecular proportions of hydrazine in solution in an aqueous lower aliphatic alcohol, the hydrazine being the only basic substance present.

9. Process for the manufacture of a polymethylene dihydrazine, which comprises heating to 50–100° C. one molecular proportion of an unsubstituted alkylene dichloride with 6–24 molecular proportions of hydrazine in solution in an aqueous lower aliphatic alcohol, the hydrazine being the only basic substance present.

10. Process for the manufacture of hexamethylene dihydrazine which comprises boiling under reflux a solution of one molecular proportion of 1:6-dichlorohexane and 6–24 molecular proportions of hydrazine in aqueous methanol, the hydrazine being the only basic substance present.

11. Process for the manufacture of tetramethylene dihydrazine, which comprises boiling under reflux a solution of one molecular proportion of 1:4-dichlorobutane and 6–24 molecular proportions of hydrazine in aqueous methanol, the hydrazine being the only basic substance present.

CLAUDE BONARD,
*Administrator of the Estate of the said Henry Dreyfus.*

REFERENCES CITED

The following references are of record in the file of this patent:

Michaelis: "Liebigs Annalen," vol. 254 (1889), pp. 115 and 117.

Baeyer et al.: "Berichte Deutsche Chem. Gesell.," vol. 22 (1889), pp. 2174 and 2175.

Wieland: "Die Hydrazine," Stuttgart, Vering von Ferdinand Enke (1913), p. 14.

Beilstein-Brager-Jacobson: "Organische Chemie," 4th edition, Berlin (1932), vol. XV, p. 582.

Van Alphen: "Rec. Trav. Chim.," vol. 57 (1938), pp. 266 and 275.